Patented Dec. 12, 1933

1,939,165

UNITED STATES PATENT OFFICE 1,939,165

FERTILIZERS STABLE FOR STORAGE AND CAPABLE OF BEING SCATTERED

Willy Eissner, Ludwigshafen-on-the-Rhine, Germany, assignor to I. G. Farbenindustrie Aktiengesellschaft, Frankfort-on-the-Main, Germany No Drawing. Application July 7, 1930, Serial No. 466,367, and in Germany July 8, 1929

10 Claims. (Cl. 71—9)

The present invention relates to fertilizers stable for storage and capable of being scattered.

Mixed fertilizers prepared from ammonium nitrate and ammonium sulphate, when they are stored under unfavorable conditions as regards the moisture content of the air, sometimes have a tendency to cake and harden.

I have now found that a fertilizer which is thoroughly stable for storage is obtained by first preparing by crystallization a salt, as homogeneous as possible, containing ammonium sulphate and ammonium nitrate in the molecular proportions of from about 1:2.2 up to 1:4, and then mixing this salt with inert or fertilizing additional materials which prevent the caking together of the particles. As such an additional material, ammonium sulphate is eminently suitable, and by employing this additional material it is possible readily to prepare a product which corresponds in its composition with the fertilizer known as ammonium sulphate nitrate, and which product is characterized by stability in storage and capability of being scattered even under unfavorable conditions.

In order to obtain as homogenous a mixture as possible of ammonium sulphate and ammonium nitrate in the proportions already specified, a melt of ammonium nitrate may be employed for example as the initial material, a quantity of ammonium sulphate corresponding to the above ratio being introduced into this melt, and the melt then being converted by any known and suitable method into a form suitable for fertilizers. The additional material which prevents caking is then incorporated with the resulting product in an appropriate amount.

Especially valuable products are obtained by starting with a salt which contains ammonium sulphate and ammonium nitrate approximately in the molecular proportions of 1:3. In this case it is preferable to separate the said salt from a solution containing more than 3 molecular proportions of ammonium nitrate to each molecular proportion of ammonium sulphate by the crystallization process according to the British Specification No. 304,872, and in this manner, contrary to what would be expected, a homogeneous salt is always obtained, the nitrogen content of which amounts on an average to 30.3 per cent. Suitable substances may now be added to this salt rich in nitrogen, in such an amount that caking together and hardening of the mixture is suppressed to a satisfactory degree or is entirely prevented, without the necessity of reducing the nitrogen content below that of the usual ammonium sulphate nitrate fertilizers.

As additional substances may be mentioned in addition to ammonium sulphate, for example kieselguhr, calcium sulphate, kaolin, siliceous residues from the production of aluminium salts and the like and also substances containing potash such as crude potash salts, or ammonium or calcium phosphates, by which another valuable element as regards fertilizing action is introduced into the mixture.

The substances to be incorporated with the mixture of ammonium nitrate and ammonium sulphate may have the same or a different grain-size from the mixture. It is preferable to select approximately the same grain size in order to prevent a separation of the mixture; on the other hand the additional substances may be employed partially or wholly in the form of dust so that they protect the single particles as a kind of powder.

The following examples will further illustrate how this invention may be carried out in practice, but the invention is not restricted to these examples.

Example 1

The initial material is a solution which is saturated at 60° centigrade and which contains 100 kilograms of ammonium sulphate and 900 kilograms of ammonium nitrate in 250 kilograms of water. The process according to the said British Specification No. 304,872 is carried out with this solution in such a manner that solid ammonium sulphate and ammonium nitrate are introduced into the dissolving vessel in the molecular proportions of 1:3 in an amount of 100 kilograms, the temperature being regulated so that the said solution enters the crystallizing tower at about 65° centigrade and leaves it at about 60° centigrade. The salt which separates out is withdrawn from the apparatus from time to time and centrifuged, while corresponding amounts of the solid salts are supplied to the dissolving vessel in the proportion specified. After the centrifuging, a homogeneous mixture of ammonium nitrate and ammonium sulphate is obtained having an average nitrogen content of 30.3 per cent and a moisture content of at the most 0.5 per cent. 1000 kilograms of this intermediate product are then mixed with 750 kilograms of ammonium sulphate, preferably having the lowest possible water content (about 0.5 per cent). In this manner a fertilizer which corresponds to ammonium sulphate nitrate fertilizers as regards composition and which exhibits no tendency to cake or harden, is obtained.

Example 2

1000 kilograms of the intermediate product obtained according to Example 1 are well mixed with 165 kilograms of kieselguhr. A mixture containing about 26 per cent of nitrogen is obtained. Calcium sulphate, preferably in the form of the anhydrous salt and in the driest possible state, may be employed instead of kieselguhr.

Example 3

1000 kilograms of the intermediate product obtained according to Example 1 are well mixed with 165 kilograms of 50 per cent potassium chloride having the lowest possible water content. In this manner a fertilizer thoroughly stable for storage is obtained which contains 7 per cent of potash in addition to 26 per cent of nitrogen.

Example 4

1000 kilograms of the intermediate product obtainable according to Example 1 are well mixed with 750 kilograms of diammonium phosphate of about the same size of the grains. A product containing about 26 per cent of nitrogen and 24.5 per cent of phosphoric acid is obtained.

When a lower content in phosphoric acid is desired, part of the diammonium phosphate may be replaced by ammonium sulphate. When employing for example 500 kilograms of the former and 250 kilograms of the latter, a product is obtained which contains about 27 per cent of nitrogen and 16 per cent of phosphoric acid.

Example 5

1000 kilograms of the intermediate product obtainable according to Example 1 are well mixed with 165 kilograms of kaolin. A product is obtained which contains about 26 per cent of nitrogen and which remains thoroughly suitable for storage and scattering even in an extremely moist atmosphere, as for example in tropical countries.

What I claim is:—

1. As new articles of manufacture, fertilizers comprising a homogeneous salt containing about 3 molecular proportions of ammonium nitrate and 1 molecular proportion of ammonium sulphate.

2. As new articles of manufacture, fertilizers comprising a homogeneous salt containing about 3 molecular proportions of ammonium nitrate and 1 molecular proportion of ammonium sulphate, said salt being mixed with an additional material which prevents the caking together of the particles.

3. As new articles of manufacture, fertilizers comprising a homogeneous salt containing about 3 molecular proportions of ammonium nitrate and 1 molecular proportion of ammonium sulphate, said salt being mixed with a fertilizing additional material which prevents the caking together of the particles.

4. As new articles of manufacture, fertilizers comprising a homogeneous salt containing about 3 molecular proportions of ammonium nitrate and 1 molecular proportion of ammonium sulphate, said salt being mixed with ammonium sulphate.

5. The process of producing fertilizers stable for storage and capable of being scattered which comprises preparing a homogeneous salt by introducing solid ammonium sulfate and ammonium nitrate in the molecular ratio of about 1 of the former to 3 of the latter into a saturated solution of these salts containing a higher amount of ammonium nitrate to sulfate than is expressed by said ratio and crystallizing said homogeneous salt from the resulting solution.

6. The process of producing fertilizers stable for storage and capable of being scattered which comprises preparing a homogeneous salt by introducing solid ammonium sulfate and solid ammonium nitrate in the molecular ratio of about 1 of the former to 3 of the latter into a saturated solution of these salts containing about 9 parts by weight of ammonium nitrate to 1 part by weight of ammonium sulfate and crystallizing said homogeneous salt from the resulting solution.

7. The process of producing fertilizers stable for storage and capable of being scattered which comprises preparing a homogeneous salt by introducing solid ammonium sulfate and ammonium nitrate in the molecular ratio of about 1 of the former to 3 of the latter into a saturated solution of these salts containing a higher amount of ammonium nitrate to sulfate than is expressed by said ratio, crystallizing said homogeneous salt from the resulting solution and then mixing said homogeneous salt with a fertilizing additional material which prevents the caking together of the particles of said salt.

8. The process of producing fertilizers stable for storage and capable of being scattered which comprises preparing a homogeneous salt by introducing solid ammonium sulfate and solid ammonium nitrate in the molecular ratio of about 1 of the former to 3 of the latter into a saturated solution of these salts containing about 9 parts by weight of ammonium nitrate to 1 part by weight of ammonium sulfate, crystallizing said homogeneous salt from the resulting solution and mixing said salt with ammonium sulfate.

9. The process of producing fertilizers stable for storage and capable of being scattered which comprises preparing a homogeneous salt by introducing solid ammonium sulphate and ammonium nitrate in the molecular ratio of about 1 of the former to 3 of the latter into a solution of these salts containing a higher amount of ammonium nitrate to sulphate than is expressed by said ratio and crystallizing said homogeneous salt from the resulting solution.

10. The process of producing fertilizers stable for storage and capable of being scattered which comprises preparing a homogeneous salt containing about three molecular proportions of ammonium nitrate and one molecular proportion of ammonium sulphate by introducing solid ammonium sulphate and ammonium nitrate in the molecular ratio of about 1 of the former to 3 of the latter into a solution of these salts saturated with respect to said homogeneous salt and containing a higher amount of ammonium nitrate to sulphate than is expressed by said ratio and crystallizing said homogeneous salt from said solution.

WILLY EISSNER.